INVENTOR
BERNARD LEBOVITZ
BY Cushman, Darby &
Cushman
ATTORNEYS

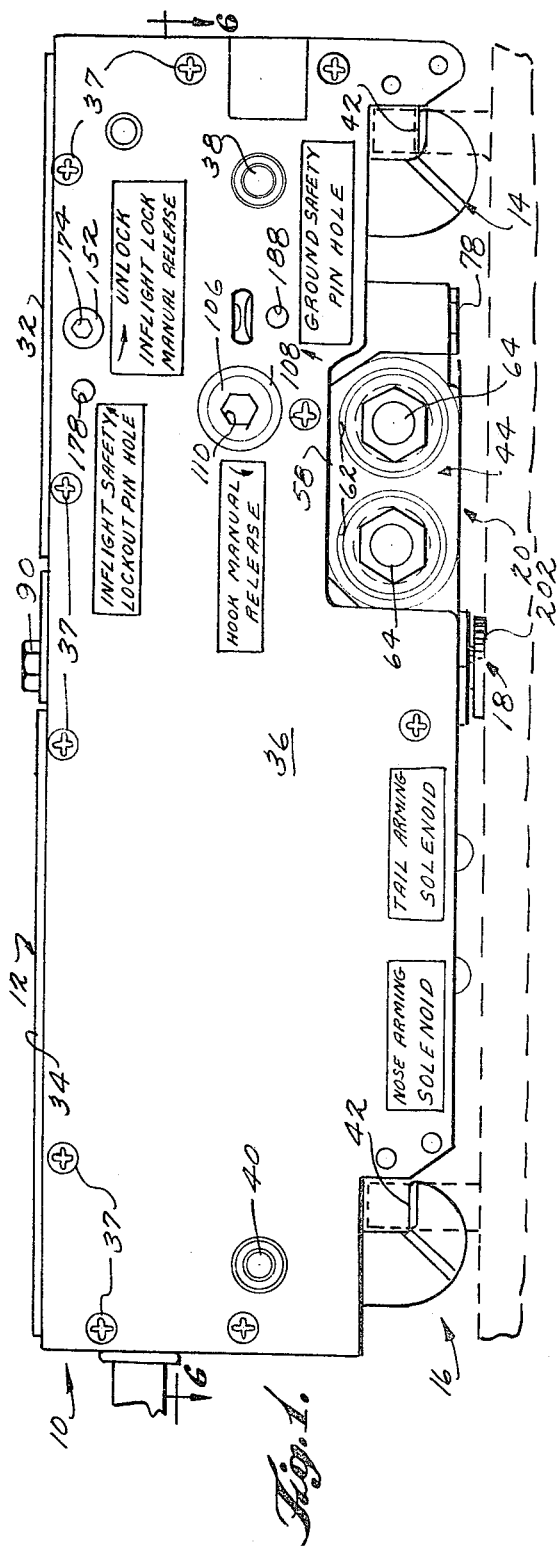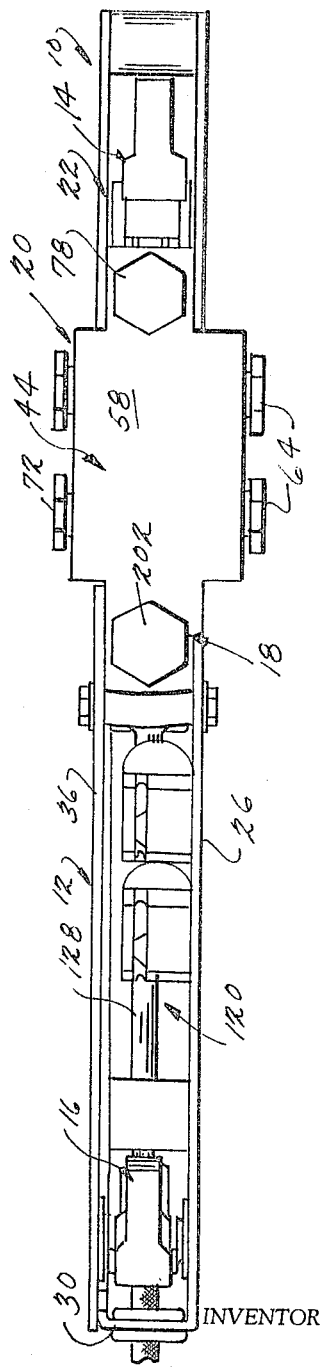

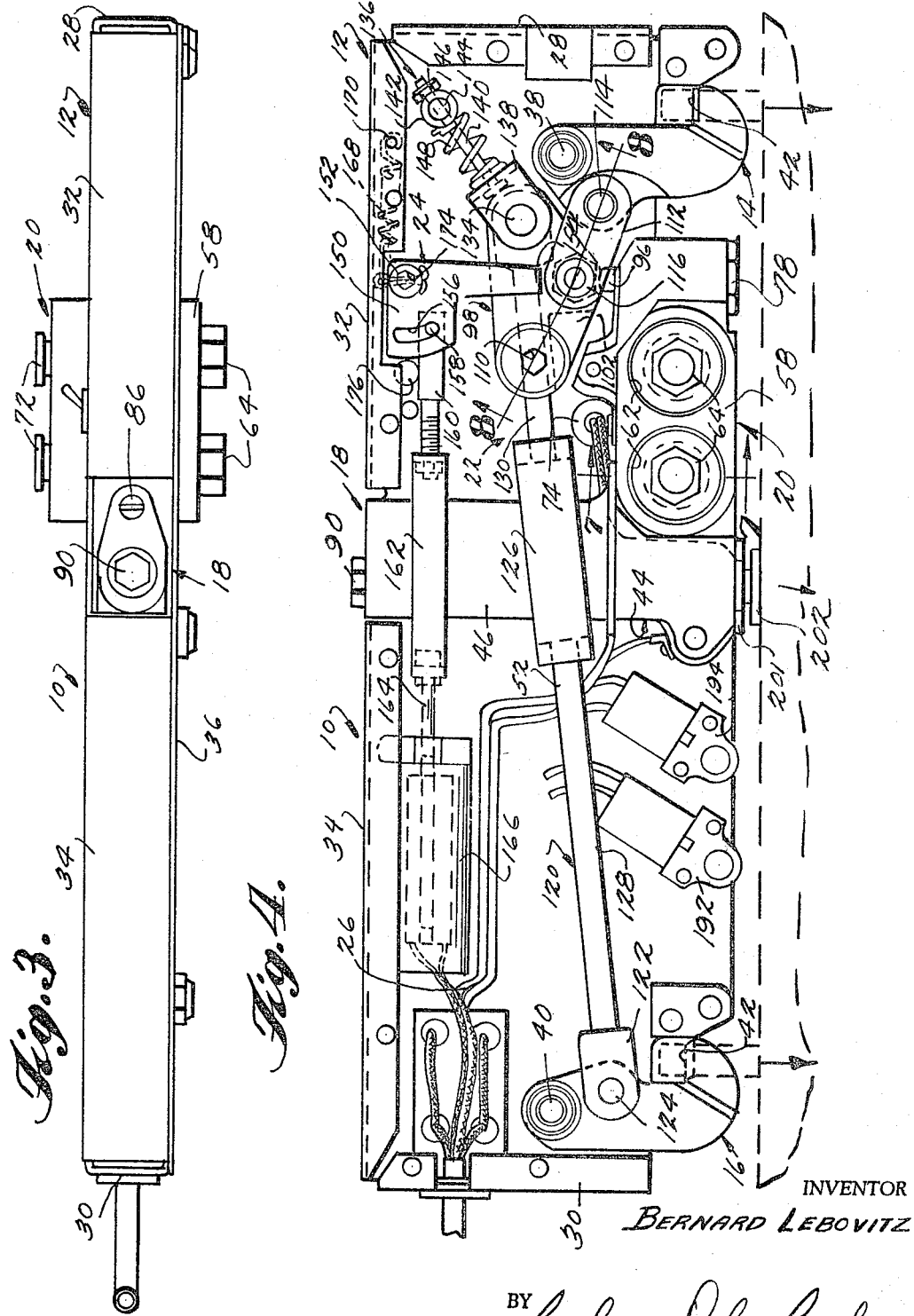

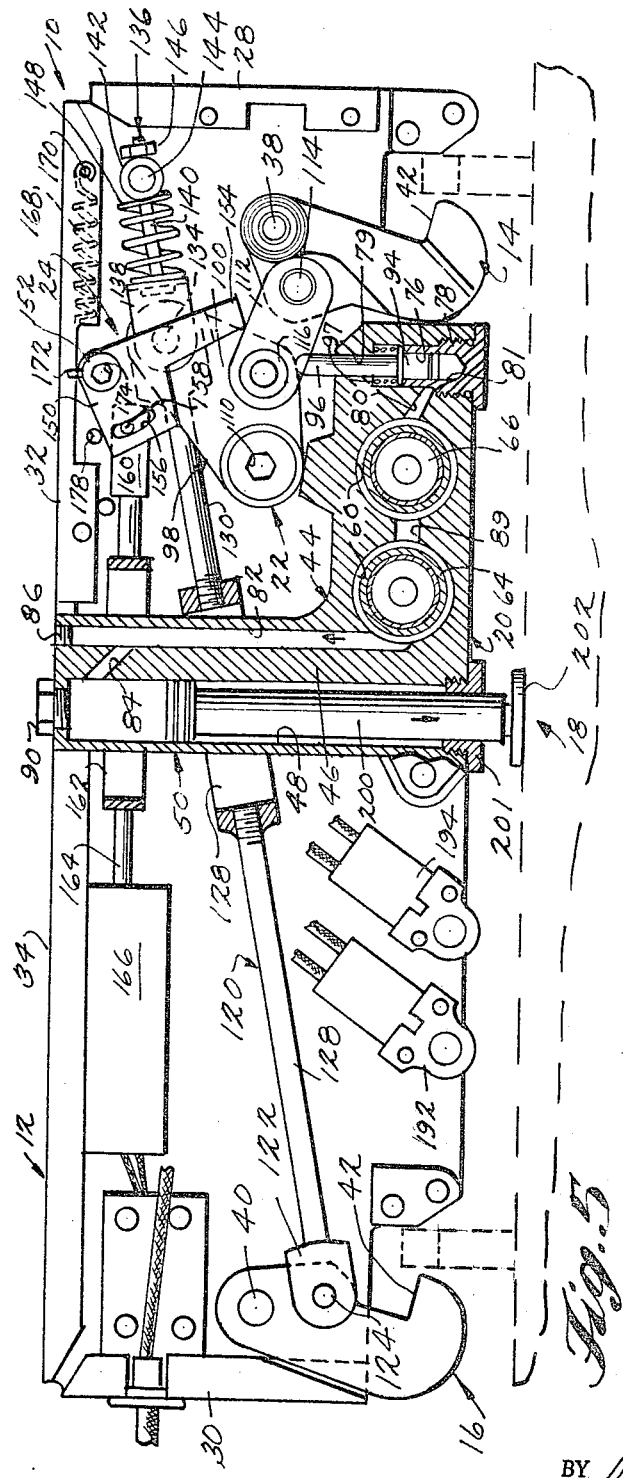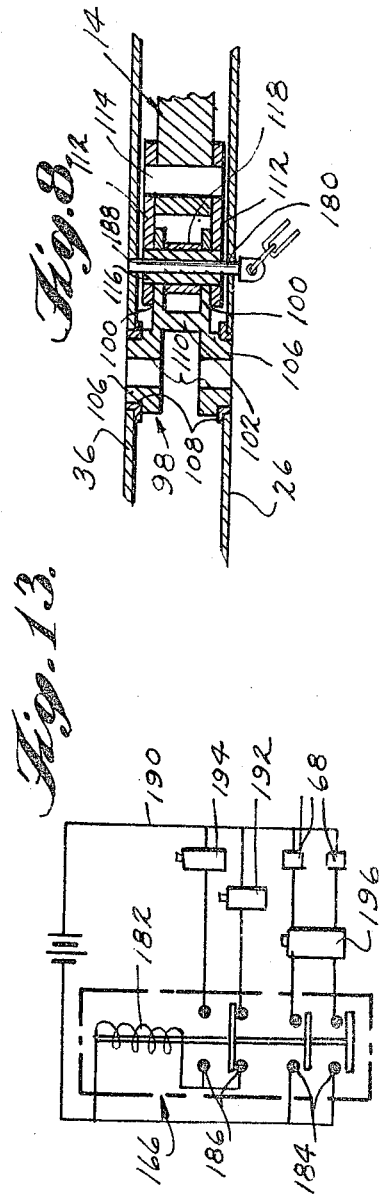

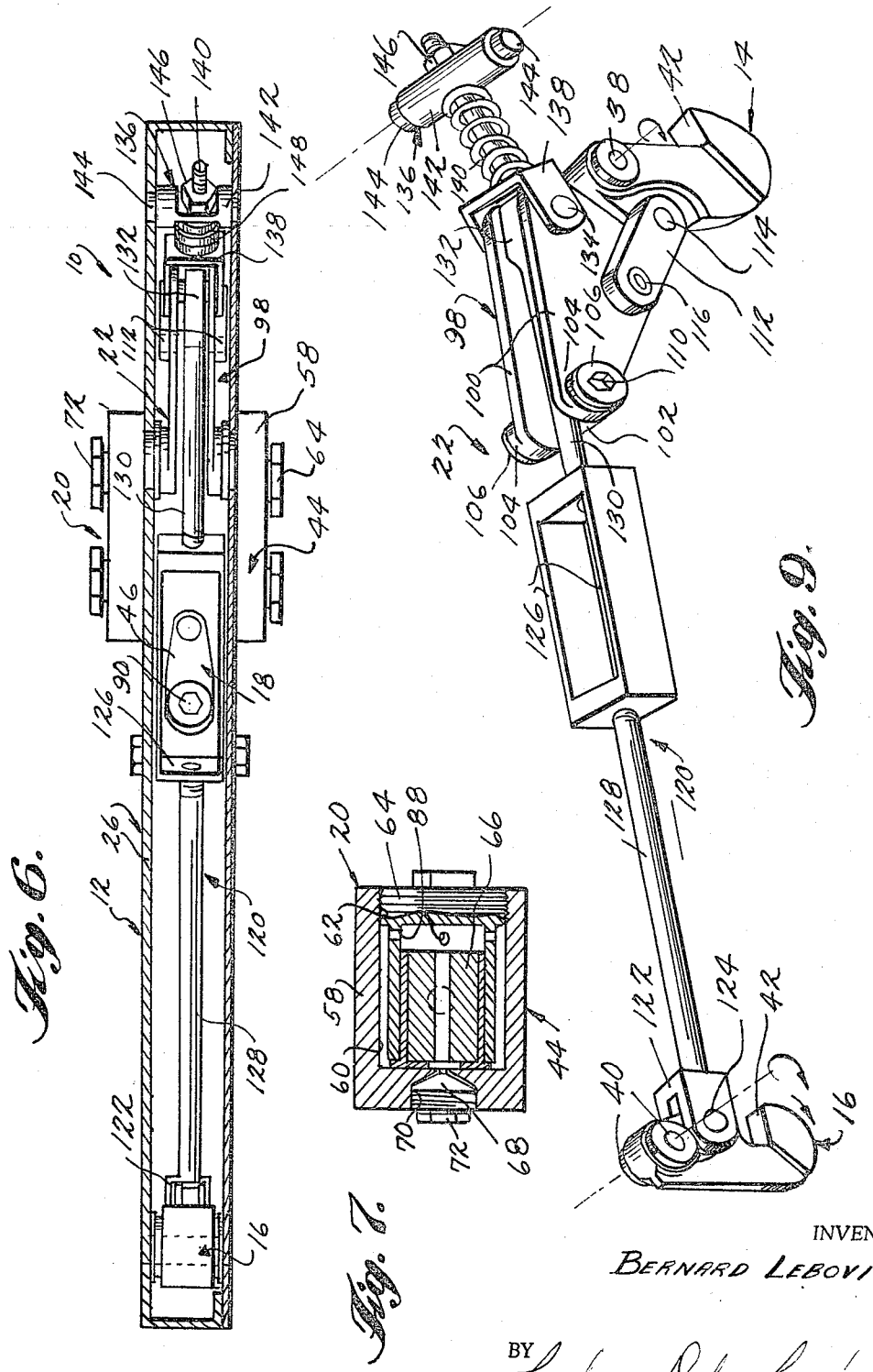

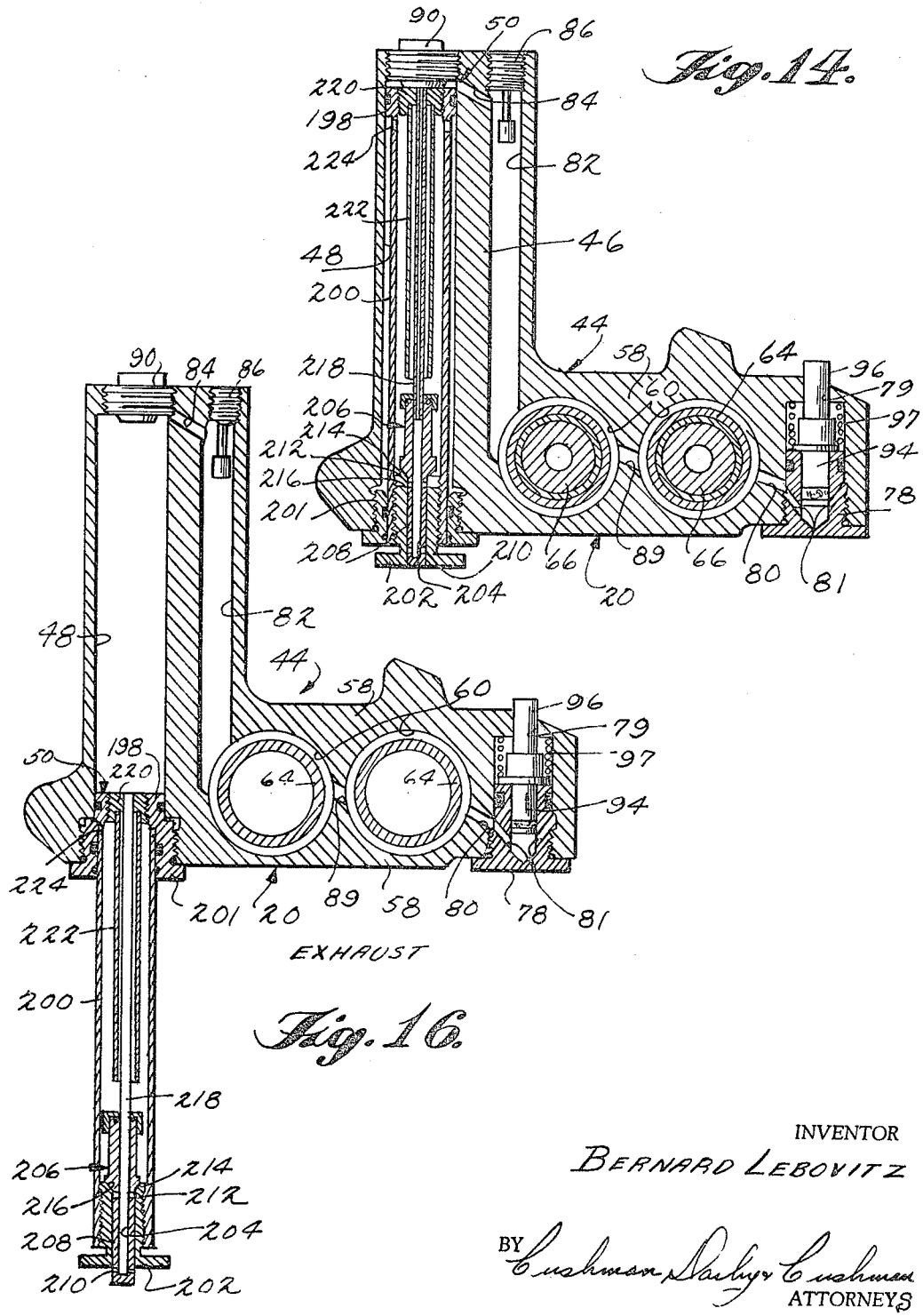

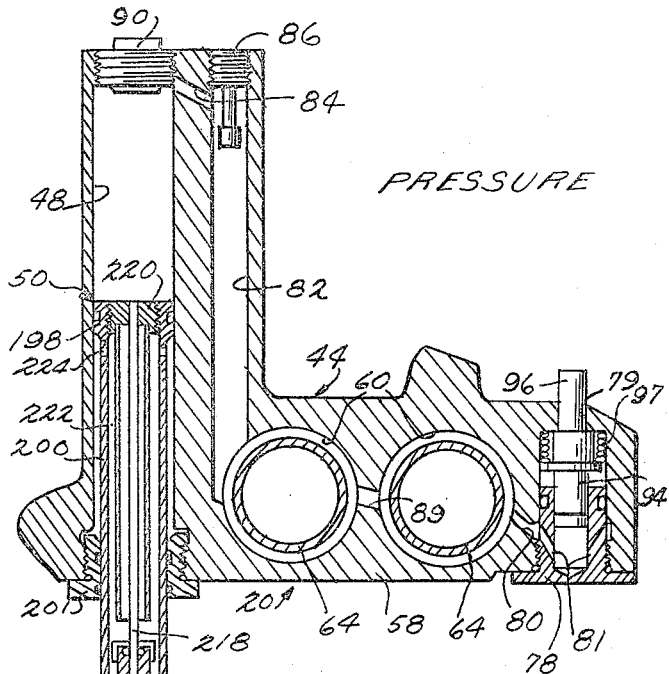
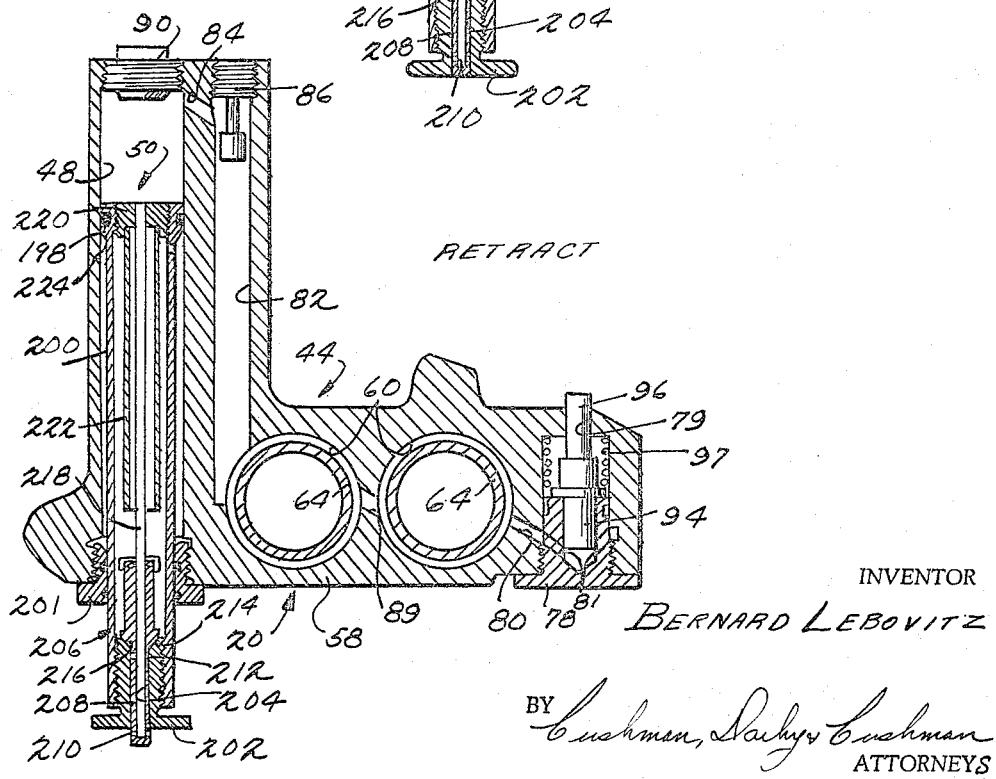

United States Patent Office 3,266,834
Patented August 16, 1966

3,266,834
STORE EJECTING RACK
Bernard Lebovitz, Scottsdale, Ariz., assignor to Rocket Power, Inc., Mesa, Ariz., a corporation of Arizona
Filed Apr. 22, 1964, Ser. No. 361,800
17 Claims. (Cl. 294—83)

This invention relates to means on an aircraft for carrying an ejecting stores therefrom in the course of flight. In particular, the invention relates to a new hook type of release mechanism for supporting a store on or in an aircraft.

The development of the modern military type aircraft, coincidental with the numerous and the variety of duties assigned thereto, led to the requirement for a rack as a support for stores carried by said aircraft. As used herein, the terms "store" or "stores" are intended to include a variety of devices such as bombs, fuel tanks, airborne lifeboats, "parasite" aircraft, missiles and other jettisonable loads. Since such stores, as contemplated above, require careful handling in the interests of safety, an object of the present invention is to provide a store-ejecting rack that is safe to use and is firmly locked against accidental release until ready for ejection of the store.

Moreover, existing store-ejector racks have serious disadvantages when operated in aircraft traveling at supersonic speeds. It has been found that stores will not fall in the normal manner under the influence of gravity. Rather, the influence of the turbulent air stream thereon can cause the store to be maintained adjacent to the aircraft or to rise relative thereto, thus seriously endangering the aircraft. Further, it has been found that upon release of a store carried beneath an aircraft, an extremely large force resulting from the circular air motion about the aircraft surfaces is applied to the tail portion of the store tending to cause the tail portion to rise substantially and interfere with the aircraft. In large aircraft employing bomb bays, a similar problem is encountered in that upon release of stores from their racks in such bomb bays, the stores can tumble in a random manner within the bomb bay as a result of the turbulent air therein, causing structural damage and obvious danger to the aircraft personnel. It has, therefore, been proposed that a system of forcefully ejecting the store from the area of the aircraft be employed. Existing systems, however, generally are characterized by a percussion impact on the store to effect its ejection. Serious disadvantages, from a safety standpoint, are inherent in such methods with the result that they do not enjoy enthusiastic or wide acceptance. It is therefore another object of the instant invention to provide an improved system for ejecting a store safely and positively from an aircraft over a wide and increased range of aircraft speeds.

Still another object of the invention is to provide a store-ejecting rack that is operated to eject a store by the pressure of gases generated by explosive means or by manual operation, the rack utilizing said pressure gases or manual force both to release or unlock the ejecting mechanism and to operate said mechanism to eject a store.

A further object of the present invention is the provision of a store ejecting rack of the type described having an improved control linkage for effecting actuation of the store retaining members, which linkage is simple in construction and effective in operation.

A further object of the present invention is the provision of a store ejecting rack of the type described having an improved ejector assembly operable to automatically retract in response to the completion of the ejecting stroke.

The invention also has for its objects to provide such means that are convenient in use, easily installed in a working position, and easily disconnected therefrom, economical to manufacture, relatively simple and of general superiority and serviceability.

These and other objects of the present invention will become more apparent during the course of the following detailed description and appended claims.

The invention may best be understood with reference to the accompanying drawings wherein an illustrative embodiment is shown.

In the drawings:

FIGURE 1 is a side elevational view of a store ejecting rack embodying the principles of the present invention;

FIGURE 2 is a bottom plan view of the rack;

FIGURE 3 is a top plan view of the rack;

FIGURE 4 is a view similar to FIGURE 1 with the side plate removed showing the position of the parts in their initial locked condition;

FIGURE 5 is a view similar to FIGURE 4, with certain parts in section illustrating the position of the parts in their store releasing condition;

FIGURE 6 is a sectional view taken along the line 6—6 of FIGURE 1;

FIGURE 7 is an enlarged fragmentary sectional view taken along the line 7—7 of FIGURE 4;

FIGURE 8 is a fragmentary sectional view taken along the line 8—8 of FIGURE 4;

FIGURE 9 is a perspective view of the control linkage assembly for the store retaining and releasing hook members;

FIGURE 13 is a schematic wiring diagram illustrating the ignition circuit of the rack; and FIGURES 14-17 are vertical sectional views of the ballistic system showing the sequence of movement of the ejector assembly.

Figure 10:
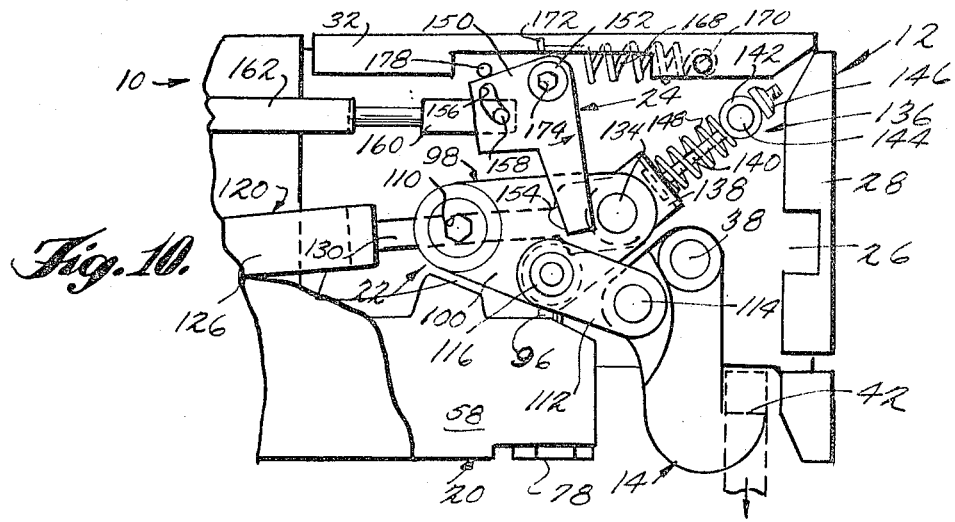
FIGURES 10, 11 and 12 are fragmentary views of the control linkage assembly showing the sequence of movement from the store retaining position to the store releasing position.

Referring now more particularly to the drawings, there is shown in FIGURES 1-5 a store ejector rack, generally indicated at 10, which embodies the principles of the present invention. The rack 10 includes a frame structure, generally indicated at 12 within which is mounted a pair of pivotal hook members 14 and 16 for retaining and releasing the stores. Mounted on the frame 10, between the hook members 14 and 16, is an ejector assembly 18 which is operable to impart a downward movement to the stores upon release by the hook members. The ejector assembly is actuated in response to the ignition of a pair of ballistic charges embodied in a breech assembly 20. The ignition of the charges of the breech assembly 20 also serves to effect the pivotal movement of the store retaining and releasing hook members 14 and 16 through the operation of a control linkage assembly, generally indicated at 22. The operation of the control linkage assembly 22 is, in turn, controlled by a locking mechanism generally indicated at 24 which serves not only to provide a mechanical lock for the control linkage assembly but an electrical interlock to the ignition of the breech assembly.

As best shown in FIGURES 1-4, the frame assembly 12 preferably includes a first side plate frame member 26 of generally rectangular configuration having certain of its edge portions bent into an L-shaped configuration so as to provide opposite end frame portions 28 and 30, and top frame portions 32 and 34, each of which has an inwardly turned flange on the extremity thereof. The frame assembly 12 also includes a second side plate frame member 36 which is detachably secured to the flanges of the end and top frame portions, by any suitable means, such as detachable fastening elements 37 or the like. The frame assembly 12 thus provides a generally rectangular interior space which is open at the bottom and within which the hook members, ejector assembly, breech assembly, control linkage assembly, and locking mechanism are mounted.

Each hook member 14 and 16 is provided with a pair of trunnions 38 and 40 respectively which are journaled in suitable bearings mounted in the respective side frame plates 36 and 26. As best shown in FIGURES 4 and 5, the pivotal axes of the hook members are spaced apart horizontally and disposed in the same horizontal plane. Each hook member also includes a store engaging surface 42 which, in the store retaining position of the hook member is disposed in horizontally spaced relation from a vertical plane passing through the axis of the associated hook member. In this way, the load of the store supported by the hook members tends to effect a clockwise movement of the hook members about their pivotal axes, as shown in FIGURES 4 and 5.

As best shown in FIGURES 4 and 5, the ejector assembly and breech assembly are preferably embodied within a single housing member 44 suitably mounted in fixed relation within the central portion of the frame assembly 12. As best shown in FIGURE 5, the housing member includes a generally vertically extending cylinder portion 46 having a vertical bore 48 extending therethrough defining a cylinder within which a piston assembly, generally indicated at 50, is slidably mounted.

As best shown in FIGURE 7, the housing member 44 also includes a lower horizontally extending breech block portion 58 having a pair of horizontally spaced cylindrical bores 60 extending horizontally inwardly from one side thereof. The outer extremity of each bore 60 is interiorly threaded, as indicated at 62, to receive the exteriorly threaded end of a tubular closure plug 64. A ballistic charge or explosive 66 is carried within each tubular closure plug, each charge preferably being in cartridge form. Each charge is ignited by an electrically actuated firing cap 68 arranged to be mounted within a bore 70 formed in the opposite side of the housing member portion 58 in communication with the associated bore 60. As shown, each firing cap bore is arranged to be selectively closed as by a threaded plug 72 or the like. The ballistic charge utilized may be of any suitable composition and preferably is capable of creating gas pressures as high as 50,000 p.s.i. Such charges may generate temperatures between 8,000 and 10,000° F.

The gases generated by the ignition of the ballistic charges 66 are communicated to the upper end of the cylinder 48 and to a cylinder 76 formed in a plug-like member 78 threadedly and sealably engaged within a counterbore in the lower end of a through bore 79 extending vertically in the breech block portion 58 of the housing member 44 at the end thereof remote from the vertical cylindrical portion 46. The cylinder 76 communicates with the adjacent bore 60 through an inclined passage 80 in the block portion 58 and an inclined passage 81 in the member 78 extending between the passage 80 and the lower end of the cylinder 76.

The upper end of the cylinder 48 is communicated with the other bore 60 through a main bore or passage 82 extending vertically in the cylinder portion 46 in parallel relation to the cylinder bore 48. The upper end portion of the passage 82 is communicated with the adjacent cylinder bore, as by an inclined connecting passage 84. The outer extremities of the passage 82 are suitably closed as by a plug 86 or the like. Each tubular closure plug 64 is provided with a plurality of circumferentially spaced radially extending ports 88 (see FIGURE 7) adjacent the threaded end thereof which communicate with the associated bore 60. Extending between the bores 60 is a connecting passage 89, which together with ports 88 provide intercommunication between the charges so that if one fails to ignite it will be ignited by the hot gas produced by the ignition of the other.

It can thus be seen that the gases generated by the ignition of the charges 66 will be communicated with the upper end of the cylinder 48 through ports 88, bores 60 and passages 82 and 89. It will also be noted that the upper end of the cylinder 48 is closed, as by a closure plug 90. The cylinder 76 receives gas pressure from the ignition of the charges 66 through the ports 88, bores 60 and passages 80 and 81.

Mounted within the cylinder 76 is a piston 94 having a piston rod member 96 fixed on the upper end thereof extending upwardly through the bore 79. A compression coil spring 97 is disposed in surrounding relation to the lower end portion of the piston rod 96 and engages an enlarged upper portion of the piston to resiliently urge the latter and the piston rod into a lower limiting position. The piston rod member 96 constitutes a striker for effecting movement of the control linkage 22 from a first position retaining the hook members 14 and 16 in engagement with the stores into a second position wherein the hook members serve to release the stores.

As best shown in FIGURES 4, 5 and 8, the control linkage assembly 22 includes a main bell crank member, generally indicated at 98. The bell crank 98 includes a pair of triangular plates 100 which are held in spaced parallel relation as by an integral connecting portion 102. Adjacent one corner of the triangular plates 100 is a pair of circular bosses 104, each of which has a trunnion-like portion 106 extending outwardly therefrom for rotatable engagement within a bearing member 108 mounted within a suitable aperture in the associated side frame members of the frame assembly 12. The bell crank 98 is thus pivotally mounted for movement about a fixed axis with respect to the frame assembly. Preferably, a hexagonal opening 110 is formed through the axis of each of the trunnion and boss portions 104 and 106, so as to receive a manual operating crank of hexagonal stock through which the control linkage assembly can be moved manually.

The hook member 14 is connected with the bell crank 98 to be moved between its store retaining position and store releasing position in response to the pivotal movement of the bell crank between its limiting positions by a pair of parallel connecting links 112. One end of the links 112 is pivotally connected to the other member, as by a pivot pin 114, and the opposite ends of the links 112 are disposed on opposite sides of the bell crank plates 100 and pivotally connected therewith by a hollow pivot pin 116. Mounted on the central portion of the hollow pivot pin 116 between the bell crank plates 100 is a striker sleeve 118 (see FIGURE 8) which, when the bell crank is disposed in its first position, is positioned directly above the upper end of the striker rod 96.

The bell crank 98 is connected with the hook member 16, so that movement of the latter between its store retaining and store releasing positions will take place in response to the movement of the bell crank between its first and second positions, by an elongated connecting link, generally indicated at 120. As best shown in FIGURES 4, 5, 6 and 9, the end of the connecting link 120 adjacent the hook member 16 is bifurcated, as indicated at 122, and is pivotally connected to the associated hook member as by a pivot pin 124. The bifurcated end 122 of the link is connected to one end of a central rectangular ring portion 126 of the link 120, as by a rod portion 128. Extending from the opposite end of the central ring portion 126 is another rod portion 130, the end of which is enlarged and apertured, as indicated at 132, to receive a pivot pin 134. The pin 134 serves to pivotally connect the link 120 to the bell crank 98 and to one end of a biasing and stop linkage 136.

As best shown in FIGURES 4, 5 and 9, the linkage 136 includes a U-shaped yoke portion 138, the legs of which extend on opposite sides of the plates 100 of the bell crank 98 and are apertured to pivotally receive the pin 134. The bight portion of the U-shaped yoke 138 has one end of a rod or bolt 140 connected therewith, the opposite end of which extends through a transverse opening formed in the central portion of a shaft 142. The ends of the shaft 142 are provided with reduced trunnion-like portions 144 which are journaled in suitable openings formed in the side plate members of the frame assembly 12. The central portion of the shaft 142 adjacent the outer extremity of the bolt 140 is flattened to receive a nut 146 threadedly engaged on the outer end of the bolt 140. The central portion of the shaft adjacent the opposite end of the bolt receiving opening is flattened to receive a washer against which one end of a compression coil spring 148 is engaged. The coil spring is disposed in surrounding relation to the bolt 140 and has its opposite end engaged with the bight portion of the U-shaped yoke 138.

The locking mechanism 24 includes a pair of parallel generally inverted L-shaped lever plate members 150 having a shaft 152 fixedly secured therebetween and maintaining the same in spaced relation sufficient to clear the legs of the yoke 138 and to engage the links 112. The ends of the shaft 152 extend outwardly beyond the lever plates and are suitably journaled within corresponding openings formed in the side plate members of the frame assembly 12. As best shown in FIGURES 4 and 5, the pivotal axis of the shaft 152 is disposed within a vertical plane passing through the axis of the striker rod 96. It will be noted that the lever plates 150 are disposed on opposite sides of the bell crank plates 100 and include one end portion 154 movable between a first or locking position disposed directly above the end of the links 112 connected with the bell crank 98 and a second or releasing position disposed laterally in the path of movement of the links 112. The other legs of the lever plates 150 are provided with elongated openings 156 which are arcuate about the pivotal axis of the shaft 152. The slots receive the ends of a pin 158 extending transversely through one end portion of a connecting rod element 160. The opposite end of the connecting rod element 160 is connected with one end of a generally rectangular ring element 162, similar to the ring element 126 previously described, both of which receive the vertical cylinder portion 46 of the housing member 44 therethrough. The opposite side of the rectangular ring element 162 is connected with one end of a connecting rod portion 164 the opposite end of which is connected to the plunger of a solenoid assembly 166.

The lever 150 is resiliently biased into its first position with the end portion 154 disposed above the adjacent end of the links 112 so as to mechanically prevent movement of the control linkage 22 out of its first position and hence the hook members 14 and 16 out of their store retaining position, by a coil spring 168, one end of which is fixed to the frame assembly as by a pin 170, the opposite end of which is connected with the eye of a cotter pin 172 extending through an appropriate opening in the central portion of the shaft 152. Preferably, the shaft 152 includes a hexagonal opening 174 extening therethrough for the purpose of receiving a crank of hexagonal stock through which the lever can be moved manually. As best shown in FIGURE 4, the lever 150 is retained in its first limiting position by the spring 168 through the engagement of the rod portion 160 with a rod or bolt 176 fixed to the side plate frame 26 at a position to engage the upper surface of the rod element 160.

As best shown in FIGURES 1 and 5, the side wall plate members 26 and 36 respectively are provided with aligned openings 178 which register with the upper edge of the lever 150 when the latter is disposed in its full releasing position. By engaging a locking pin, such as the pin 180 shown in FIGURE 8, through the openings 178, when the locking lever 150 is manually moved into its releasing position, the same is mechanically retained therein against movement into its locking position so as to permit manual movement of the control linkage.

The electrical interlock circuit for releasing the locking lever and igniting the ballistic charges 66 is shown schematically in FIGURE 13. The solenoid assembly 166 includes a coil 182, a pair of normally open ignition switch contacts 184 and a pair of holding switch contacts 186, one of which is normally open and the other of which is normally closed. The coil 182 is connected across a pair of main power lines 188 and 190 in series with the normally closed switch contact 186 and a normally open solenoid actuating switch 192. The normally open switch contacts 186 are connected in parallel with the coil 182 in series with a normally closed re-set switch 194. The ignition switch contacts 184 are connected across the main lines 188 and 190 in series with a main ignition switch 196 and the firing caps 68.

Referring now more particularly to FIGURES 14–18, the piston assembly 50 is operable, upon ignition of the ballistic charges 66, to move downwardly to eject the released stores and to automatically retract into its initial uppermost position. To this end, the piston assembly 50 includes an upper interiorly threaded hollow piston-like member 198 having a hollow tubular piston rod member 200 extending downwardly from the lower end thereof. The lower end of the piston rod has its exterior periphery slidably sealably engaged at the lower end of the cylinder 48, by a suitable plug member 201, and has its interior periphery threaded to adjustably sealingly receive a foot member 202, the lower surface of which is adapted to engage the stores to eject the same during the downward movement of the piston rod.

The foot member 202 is provided with a central bore 204 within which the lower end of a valve member, generally indicated at 206, is slidably mounted. As shown, the lower end portion of the valve member 206 is in the form of a tubular stem portion 208 closed at its lower extremity and including a plurality of circumferentially spaced outlet openings 210 formed therein just above the lower closed extremity thereof. At the upper end of the tubular portion 208 there is provided a plurality of circumferentially spaced radially extending openings 212. The valve member includes a central exterior frusto-conical peripheral portion 214 disposed just above the openings 212 which defines a valve surface for engaging a corresponding frusto-conical recess 216 formed in the upper end of the foot member 202. The upper end portion of the valve member includes a central opening forming a continuation of the hollow interior of the lower stem portion 208, which opening slidably sealingly receives the lower end of a tube 218. The upper end of the tube is fixed within a plug-like member 220 threadedly engaged within the piston member 198. Preferably, a valve guide or stop sleeve 222 is secured at its upper end to the plug member 220 and extends downwardly therefrom in concentric relation to the tube 218. It will be noted that the piston rod 200 is provided with a plurality of circumferentially spaced radially extending openings 224 at a position adjacent the piston member 198.

*Operation*

It will be understood that the frame assembly of the present construction is adapted to be suitably mounted in conventional fashion on aircraft for the purpose of receiving stores to be released in flight. The stores are engaged with the present rack by first moving the locking lever 150 manually (by means of a hexagonal bar crank as aforesaid) into its unlocked or release position, as shown in FIGURE 5, and retaining the same therein by inserting a pin 180 in the apertures 178. With the locking lever thus retained in its release position, the control linkage assembly 22 is now moved (by a similar hexagonal bar crank, as aforesaid) to dispose the hook members into their release position. Once the store has been engaged on the hook members, the control linkage is then manually moved back into its store retaining position and preferably a ground safety pin is engaged through the hollow pin 116 and through registering openings 118 formed in the side frame plates of the frame assembly 12 as shown in FIGURES 1 and 8. Next, the pin 180 is removed from the apertures 178 and the locking lever 150 is moved back into its locked position.

It can thus be seen that the present invention provides a number of safety features which would prevent accidental release of the stores, both while the aircraft is on the ground and in flight. The control linkage assembly 22, which must be moved in order to move the hook members into a position to release the stores, is provided with two separate mechanical locks which must be removed before movement can take place, namely the pin in the ground safety holes 188, which positively prevent any movement of the control linkage, and the locking lever 50, which positively prevents anything more than a very limited movement of the control linkage assembly. It will further be understood that until the solenoid assembly 166 is actuated to move the locking lever into its release position, the firing caps for igniting the ballistic charges cannot be electrically energized because of the interlock switch contacts 184 which close only when the solenoid assembly is energized to move the locking lever 150 into its release position.

Under normal operating conditions the pin 180 which is engaged in the ground safety pin hole 188 is utilized only while the aircraft is on the ground and is removed as an initial step in preparing for flight or whenever the plane is airborne.

The relative position of the parts of the present rack prior to actual operation is shown in FIGURE 4. Before actual operation can take place, it is first necessary for the operator to press the button 192 which serves to energize the coil 182 of the solenoid assembly 166. This energization of the solenoid assembly will cause the plunger of the solenoid to move which, through the linkage elements 160, 162 and 164 and the engagement of pin 158 within the slots 156 serves to move the locking lever 150 from its locking position shown in FIGURE 4 into its unlocked or releasing position, as shown in FIGURE 10.

The energization of coil 182 also serves to energize the holding circuit through reset switch 194 and to close switch contacts 184 completing the circuit to the firing caps 68 under the control of the ignition swich 196. When the operator closes switch 196, the firing caps 68 are ignited which, in turn, ignite the ballistic charges 66. Ignition of the ballistic charges creates high pressure gases which are transmitted to the cylinder 76 through ports 86, bore 60 and passages 80 and 81, causing the piston 94 and striker rod 96 to move upwardly. During the upward movement of the striker rod 96, striker sleeve 118 is engaged which effects movement of the control linkage assembly 22 and hence the hook members from their store retaining position to their store releasing position.

The gases under pressure generated by the ignition of the charges is also communicated to the upper end of the cylinder 48 through ports 86, passages 89, 82 and 84 which has the effect of moving the piston assembly 50 downwardly. This downward movement of the piston assembly is thus substantially simultaneous with the movement of the hook members into their release position and imparts a downward thrust to the stores as they are released from the hook members.

It will be understood that a conventional nose arming solenoid 190 and a conventional tail arming solenoid 192 may be provided as shown in FIGURES 1, 4 and 5. Both of these solenoids are of conventional construction and embodied within the control circuit in a conventional manner.

The operation of the control linkage assembly 22 is a particularly significant feature of the present invention. As can be seen from FIGURE 4, the load or force exerted by the stores on the hook members 14 and 16, due to the offset relation between the pivotal axes of the hook members and their store engaging surfaces 42, tend to effect a clockwise movement of the hook members. Through the links 112 and 120 this tendency of the hook members to move in a counterclockwise direction is transmitted to the bell crank 98, when the latter is in its initial or store retaining position, in such a way as to tend to move the bell crank in a clockwise direction as viewed in FIGURE 10. It will be noted that the axis of the pivot pin 116 is disposed below a plane passing through the pivotal axis of the bell crank 98 and the pivotal axis of the pivot pin 114. In this way, the link 112 transmits the force, tending to move the hook member 14, to the bell crank 98 so as to tend to move the bell crank 98 in a clockwise direction. The biasing and stop linkage 136 through the engagement of the nut 146 with the shaft 144 serves to limit the clockwise movement of the bell crank 98. The spring 148 of the linkage 136 tends to move the bell crank in a clockwise direction.

In the limiting position shown in FIGURE 10, the tendency for the hook member 16 to move as a result of the load of the store is transmitted, by the link 120, directly through the pivotal axis of the bell crank so that, in the initial limiting position of the control linkage assembly, the total resultant force acting upon the bell crank 98 is such as to tend to move the same in a clockwise direction, as aforesaid. It will also be understood that by adjusting the position of the nut 146 on the bolt 140, the initial or store retaining position of the control linkage 22 can be varied somewhat either to increase the force tending to move the bell crank 98 into such limiting position or to decrease the same.

After the locking lever 150 has been moved into its release position and the striker rod 96 has been moved upwardly to engage the striker sleeve 118, this engagement will effect a counterclockwise movement of the bell crank 98 from the position shown in FIGURE 10. After a first relatively short predetermined movement of the bell crank, the forces transmitted to the bell crank through the hook members 14 and 16 and links 112 and 120 by the load of the stores is changed from one tending to move the bell crank 98 in a clockwise direction to one tending to move the bell crank in a counterclockwise direction. This change in the resultant force acting on the bell crank as a result of the load of the stores occurs just before the pivotal axis of the shaft 116 moves upwardly past the plane passing through the pivotal axes of the bell crank 98 and the axis of the pivot pin 114. During this movement it will be noted, however, that compression spring 148 is acting in a direction to cause clockwise rotation of the bell crank, but the strength of this spring is less than the force of the load of the stores.

Figure 11:
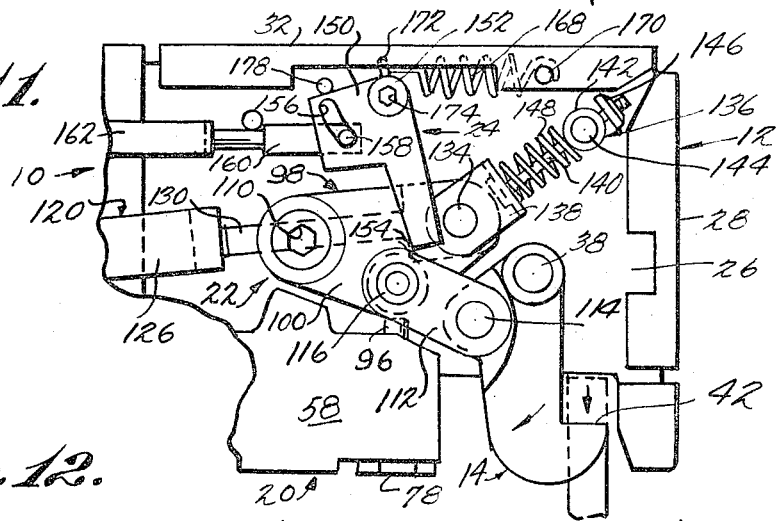
Figure 12:
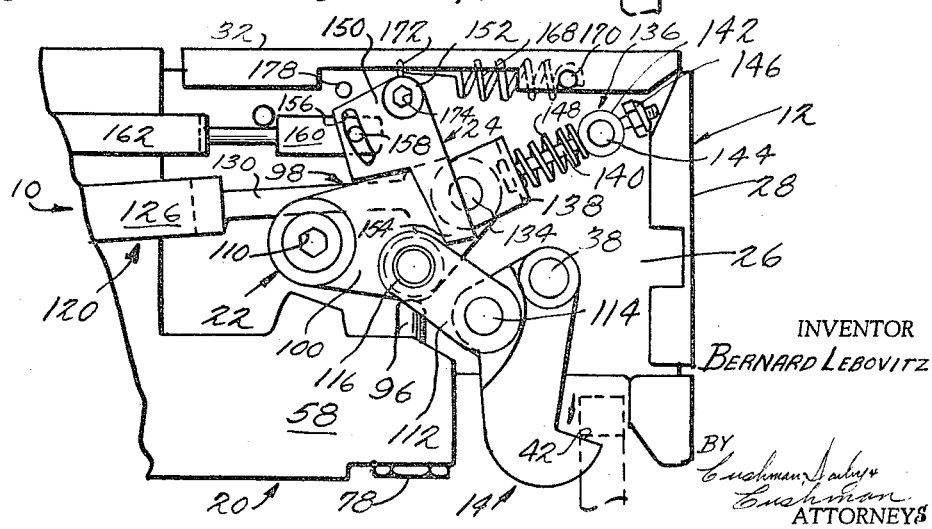

After the first predetermined counterclockwise movement of the bell crank 98 has taken place, continued movement of the bell crank in a counterclockwise direction will take place, both as a result of the engagement of the striker rod 96 with the striker sleeve 118 and the load of the stores, against the action of spring 148, for a second predetermined distance of movement. This position or distance of movement is reached when the axis of the pivot pin 134 reaches a plane passing through the axis of the bell crank 98 and the axis of the shaft 144 of the biasing and stop linkage 136. As the bell crank 98 continues its movement beyond the second predetermined position, as shown in FIGURE 11, the force of the spring 148 of the biasing and stop linkage will then shift from one opposing counterclockwise movement of the bell crank to one assisting such movement. The limitation of this counterclockwise movement of the bell crank 98 is determined by the biasing and stop linkage 136 and is shown in FIGURE 12. It will be noted that in the final or store releasing position as shown in FIGURE 12, pivot pin 134 is spaced above a plane passing through the axis of the bell crank 98 and the axis of the shaft 144 a distance equal to the distance of the axis of the pivot pin from such plane when the control linkage assembly is disposed in its initial position. Moreover, since the spring 148 of the biasing and stop mechanism acts to bias the bell crank 98 in a counterclockwise direction when the latter is disposed in its final or releasing position, the spring serves to retain the control linkage assembly in the release position.

The above-mentioned operation of the control linkage assembly wherein the linkage is biased into its store retaining position, both by spring pressure and by the load of the stores themselves, and the shifting or reversal of the direction of action of these forces during the movement of the control linkage assembly from such initial position to its final release position, assures a quick and positive release of the stores and a final retention of the hooks against movement back into their store retaining position after the stores have been released.

The operation of the piston assembly 50, as shown in FIGURES 14–17, is another significant feature of the present invention. FIGURE 14 illustrates the position of the parts of the piston assembly 50 prior to ignition. As shown, the valve member 206 is disposed in an upper closed position wherein the lower extremity thereof is in alignment with the lower surface of the foot member 202 so that outlets 210 are closed. It will be understood that in actual operation the foot member as well as the lower extremity of the valve member 206 will be in engagement with the stores retained on the hook members. With the valve member 206 in its upper position, the lower outlet openings 210 are closed and the upper openings 212 communicate the interior of the valve member with the interior of the hollow piston rod 200. The openings 224 serve to communicate the interior of the piston rod 200 with the cylinder 48 below the piston 198.

When ignition occurs, the pressurized gases entering the top of the cylinder 48 act on the upper end of the piston rod and pass through the tube 218, valve member 206, openings 212 and 224 so as to pressurize the entire cylinder 48 as well as the interior of the piston rod. The gas pressure acting on the piston assembly through the effective area defined by the exterior surface of the piston rod 200 serves to move the entire piston assembly downwardly. This pressure also tends to move the valve member 206 downwardly but such movement can not occur due to the engagement of the stores with the lower extremity of the valve member. The piston assembly thus moves in its ejected movement with the parts as shown in FIGURE 15.

When the piston assembly reaches the end of its downward movement, the store continues to move permitting the valve member 206 to move into its lowermost position as shown in FIGURE 16. This movement of the valve member 206 opens the lower outlet openings 210 permitting the cylinder 48 above the piston 198 and the ballistic system communicating therewith to exhaust at atmospheric pressure. As shown in FIGURE 16, when the ballistic system is exhausted the striker rod 96 will return to its initial or lowermost position under the action of the coil spring 97.

In addition, when the valve member 206 is in its lowermost position as shown in FIGURE 16, the valve surfaces 214 and 216 are in engagement thus closing the openings 212 and sealing the pressurized gases within the interior of the piston rod 200, which gases are communicated, through the openings 224, with the lower end of the cylinder 48 below the piston 198. This sealed pressure, acting on an effective area equal to the difference between the exterior periphery of the piston and the exterior periphery of the piston rod, will cause the piston assembly to move upwardly as shown in FIGURE 17 and until it is disposed in its uppermost or completely retracted position.

The piston assembly 50 is thus automatically retracted through the use of the pressurized gases generated by the ignition of the ballistic charges, thus eliminating the necessity of providing strong return springs or the like which may detrimentally effect the ballistic characteristics desired.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a store ejecting rack comprising frame means, a pair of spaced hook members secured to said frame means for pivotal movement between a store retaining position and a store releasing position, each of said hook members having store engaging surface means disposed in horizontally offset relation with respect to its pivotal axis when disposed in said store retaining position so that the weight of the store retained thereby constitutes a force tending to effect pivotal movement of the hook member out of its store retaining position toward its store releasing position, a control linkage assembly carried by said frame means and operatively connected with said hook members for effecting movement thereof between said store retaining and store releasing positions, a breech assembly carried by said frame means for receiving ballistic charge means capable of generating gases under pressure upon ignition, an actuating member carried by said frame means in communicating relation with said breech assembly for movement in response to the generation of gases under pressure within said breech assembly into an actuating position wherein said control linkage assembly is operable to effect movement of said hook members from said store retaining position into said store releasing position, ejector means carried by said frame means in communicating relation with said breech assembly for applying an ejecting force to the store in response to the generation of gases under pressure within said breech assembly and to the movement of said hook members into said store releasing position, the improvement which comprises said control linkage assembly comprising a bell crank secured to said frame means for pivotal movement between first and second limiting positions corresponding with the store retaining and store releasing positions of said hook members, biasing means operatively connected between said bell crank and said frame means so as to apply a biasing force acting to pivot said bell crank in one direction toward said first limiting position when said bell crank is disposed between said first limiting position and a first intermediate position to pivot said bell crank in the opposite direction toward said second limiting position when said bell crank is disposed between said intermediate position and said second limiting position, stop means operatively associated with said bell crank and said frame means for preventing pivotal movement of said bell crank in said one direction beyond said first limiting position and for preventing pivotal movement of said bell crank in said opposite direction beyond said second limiting position, and link means pivotally connected between each of said hook members and said bell crank so that the force of the weight of the store acts to pivot said bell crank in said one direction into said first limiting position when said bell crank is disposed between said first limiting position and a second intermediate position and to pivot said bell crank in the opposite direction into said second limiting position when said bell crank is disposed between said second intermediate position and said second limiting position.

2. The improvement as defined in claim 1 wherein said stop means comprises a first pivotal connection on said frame means, a second pivotal connection on said bell crank between said first pivotal connection and the pivotal axis of said bell crank having its axis disposed within a plane passing through the pivotal axis of said bell crank and the axis of said first pivotal connection when said bell crank is disposed in said first intermediate position, and an elongated stop member connected between said pivotal connections so as to permit arcuate movement of said second pivotal connection about the axis of said bell crank on opposite sides of said plane and for limiting the extent of such arcuate movement away from said common plane to positions corresponding to the limiting positions of said bell crank and wherein said biasing means comprises a compression coil spring disposed in surrounding relation to said elongated stop member and acting between said pivotal connections.

3. The improvement as defined in claim 2 wherein said link means comprises a first link pivotally connected at one end to one of said hook members and pivotally connected at its opposite end to said bell crank about the axis of said second pivotal connection and a second link pivotally connected at one end to the other of said hook members and pivotally connected at its other end to said bell crank at a position spaced from said second pivotal connection and the pivotal axis of said bell crank, the pivotal axes of said second link being disposed within a common plane passing through the pivotal axis of said bell crank when said bell crank is disposed in said second intermediate position, said second intermediate position being disposed between said first limiting position and said first intermediate position.

4. The improvement as defined in claim 3 wherein said second pivotal connection comprises an element fixed to the adjacent end of said stop member and a pivot pin extending through said element, said bell crank and the adjacent end of said first link and wherein said first pivotal connection comprises a shaft journaled on said frame means having a central transverse aperture formed therein slidably receiving the adjacent end portion of said stop member, the extremity of the end portion of the stop member extending through said aperture having a nut threadedly engaged thereon.

5. The improvement as defined in claim 3 wherein said actuating member comprises a vertically extending piston rod disposed below the pivotal connection between said bell crank and said second link and engageable therewith during its movement into said actuating position to effect movement of said bell crank away from said first limiting position toward said second limiting position.

6. The improvement as defined in claim 5 including a locking lever pivoted to said frame means about an axis disposed above said bell crank in general vertical alignment with the axis of said piston rod for movement between a locking position and a releasing position, said lever including an end portion disposed above and in the path of movement of the end of said second link pivoted to said bell crank when the latter is in its first limiting position and said locking lever is in said locking position.

7. The improvement as defined in claim 1 wherein said ejector means comprises a cylinder, a piston assembly mounted for reciprocating movement within said cylinder from an upper initial position into a lower ejecting position in response to the generation of gases under pressure in said breech assembly, valve means carried by said piston assembly disposed in a closed position communicable with the gases under pressure generated within said breach assembly when said piston assembly is disposed in said initial position in engagement with a store and movable into an open position to exhaust to atmosphere the gases under pressure acting to move said piston assembly into said ejecting position in response to the movement of the store away from said piston assembly, said piston assembly being biased to move from said ejecting position into said initial position in response to the exhaust of said gases under pressure to the atmosphere.

8. The improvement as defined in claim 7 wherein said assembly comprises a piston, a hollow piston rod secured to said piston and extending downwardly therefrom outwardly of said cylinder, means in the lower end of said cylinder slidably sealingly receiving the lower end of said piston rod, said piston rod having opening means therein adjacent said piston communicating the interior of said piston rod with said cylinder below said piston, said valve means communicating the interior of said piston rod with said cylinder above said piston when said valve means is disposed in said closed position and sealing the gases under pressure within the interior of said piston rod in response to the movement of said valve means into said open position so that said sealed gases under pressure serve to bias said piston and piston rod from said ejecting position into said initial position.

9. In a store ejecting rack comprising frame means, a pair of spaced hook members secured to said frame means for pivotal movement between a store retaining position and a store releasing position, each of said hook members having store engaging surface means disposed in horizontally offset relation with respect to its pivotal axis when disposed in said store retaining position so that the weight of the store retained thereby constitutes a force tending to effect pivotal movement of the hook member out of its store retaining position toward its store releasing position, a control linkage assembly carried by said frame means and operatively connected with said hook members for effecting movement thereof between said store retaining and store releasing positions, a breech assembly carried by said frame means for receiving ballistic charge means capable of generating gases under pressure upon ignition, an actuating member carried by said frame means in communicating relation with said breech assembly for movement in response to the generation of gases under pressure within said breech assembly into an actuating position wherein said control linkage assembly is operable to effect movement of said hook members from said store retaining position into said store releasing position, ejector means carried by said frame means in communicating relation with said breech assembly for applying an ejecting force to the store in response to the generation of gases under pressure within said breech assembly and to the movement of said hook members into said store releasing position, the improvement which comprises said ejector means comprising a cylinder, a piston assembly mounted for reciprocating movement within said cylinder from an upper initial position into a lower ejecting position in response to the generation of gases under pressure in said breech assembly, valve means carried by said piston assembly disposed in a closed position communicable with the gases under pressure generated within said breech assembly when said piston assembly is disposed in said initial position in engagement with a store and movable into an open position to exhaust to atmosphere the gases under pressure acting to move said piston assembly into said ejecting position in response to the movement of the store away from said piston assembly, said piston assembly being biased to move from said ejecting position into said initial position in response to the exhaust of said gases under pressure to the atmosphere.

10. The improvement as defined in claim 9 wherein said piston assembly comprises a piston, a hollow piston rod secured to said piston and extending downwardly therefrom outwardly of said cylinder, means in the lower end of said cylinder slidably sealingly receiving the lower end of said piston rod, said piston rod having opening means therein adjacent said piston communicating the interior of said piston rod with said cylinder below said piston, said valve means communicating the interior of said piston rod with said cylinder above said piston when said valve means is disposed in said closed position and sealing the gases under pressure within the interior of said piston rod in response to the movement of said valve means into said open position so that said sealed gases under pressure serve to bias said piston and piston rod from said ejecting position into said initial position.

11. The improvement as defined in claim 10 wherein said piston assembly further includes a tube secured at its upper end to said piston and extending downwardly within said hollow piston rod, said valve means including a valve member having a bore slidably sealingly mounted on the lower end of said tube, said valve member including a lower tubular portion having its lower extremity closed and an outlet formed therein adjacent said closed extremity, said piston rod having a member secured to the lower end thereof slidably sealingly receiving the lower tubular portion of said valve member closing said outlet when said valve member is disposed in said closed position, said valve member including an exterior frusto-conical valve surface above said lower tubular portion, the lower tubular portion of said valve member having an opening therein adjacent said valve surface communicating with the interior of said piston rod when said valve member is disposed in said closed position, said piston rod member having a complementary frusto-conical valve surface engagingly receiving said exterior valve surface when said valve member is disposed in said open position.

12. A store ejecting rack comprising frame means, a pair of spaced hook members secured to said frame means for pivotal movement between a store retaining position and a store releasing position, a control linkage assembly carried by said frame means and operatively connected with said hook members for effecting movement thereof between said store retaining and store releasing position, a breech assembly carried by said frame means for receiving ballistic charge means capable of generating gases under pressure upon ignition, ballistic charge means within said breech assembly, electrically energized ignition means for igniting said ballistic charge means within said breech assembly so as to generate gases under pressure, an actuating member carried by said frame means in communicating relation with said breech assembly for movement in response to the generation of gases under pressure within said breech assembly into an actuating position wherein said control linkage assembly is operative to effect movement of said hook members from said store retaining position into said store releasing position, ejector means carried by said frame means in communicating relation with said breech assembly for applying an ejecting force to the store in response to the generation of gases under pressure within said breech assembly and to the movement of said hook members into said store releasing position, mechanical locking means secured to said frame means for manual movement between a locking position disposed within the path of movement of said control linkage assembly when said hook members are disposed in said store retaining position for positively preventing substantial movement of said control linkage assembly in a direction to effect movement of said hook members away from said store retaining position and a releasing position permitting such movement of said control linkage assembly, power operated means operatively connected with said mechanical locking means so as to permit manual movement thereof and actuatable to effect movement of said mechanical locking means from said locking position into said releasing position, means for actuating said power operated means, switch means for energizing said electrically energized ignition means, and relay means electrically connected with said switch means for rendering the latter inoperable to energize said ignition means except when said power operated means is actuated.

13. A store ejecting rack as defined in claim 12 including manually operable means for mechanically retaining said locking means in said releasing position.

14. A store ejecting rack as defined in claim 13 including manually operable means for mechanically preventing a movement of said control linkage assembly out of a position retaining said hook members in said store retaining position.

15. A store ejecting rack comprising frame means, a pair of spaced hook members secured to said frame means for pivotal movement between a store retaining position and a store releasing position, a control linkage assembly carried by said frame means and operatively connected with said hook members for effecting movement thereof between said store retaining and store releasing position, a breech assembly carried by said frame means for receiving ballistic charge means capable of generating gases under pressure upon ignition, ballistic charge means within said breech assembly, electrically energized ignition means for igniting said ballistic charge means within said breech assembly so as to generate gases under pressure, an actuating member carried by said frame means in communicating relation with said breech assembly for movement in response to the generation of gases under pressure within said breech assembly into an actuating position wherein said control linkage assembly is operative to effect movement of said hook members from said store retaining position into said store releasing position, ejector means carried by said frame means in communicating relation with said breech assembly for applying an ejecting force to the store in response to the generation of gases under pressure within said breech assembly and to the movement of said hook members into said store releasing position, mechanical locking means secured to said frame means for movement between a locking position disposed within the path of movement of said control linkage assembly when said hook members are disposed in said store retaining position for positively preventing substantial movement of said control linkage assembly in a direction to effect movement of said hook members away from said store retaining position and a releasing position permitting such movement of said control linkage assembly, power operated means for effecting movement of said mechanical locking means from said locking position into said releasing position, and switch means electrically connected with said electrically energized ignition means for preventing energization of said ignition means when said locking means is in said locking position and permitting energization of said ignition means when said locking means is in said releasing position, said control linkage assembly comprising a bell crank secured to said frame means for pivotal movement between first and second limiting positions corresponding with the store retaining and store releasing positions of said hook members, biasing means operatively connected between said bell crank and said frame means so as to apply a biasing force acting to pivot said bell crank in one direction toward said first limiting position when said bell crank is disposed between said first limiting position and a first intermediate position and to pivot said bell crank in the opposite direction toward said second limiting position when said bell crank is disposed between said intermediate position and said second limiting position, stop means operatively associated with said bell crank and said frame means for preventing pivotal movement of said bell crank in said one direction beyond said first limiting position and for preventing pivotal movement of said bell crank in said opposite direction beyond said second limiting position, and link means pivotally connected between each of said hook members and said bell crank so that the force of the weight of the store acts to pivot said bell crank in said one direction into said first limiting position when said bell crank is disposed between said first limiting position and a second intermediate position and to pivot said bell crank in the opposite direction into said second limiting position when said bell crank is disposed between said second intermediate position and said second limiting position.

16. A store ejecting rack comprising frame means, a pair of spaced hook members secured to said frame means for pivotal movement between a store retaining position and a store releasing position, a control linkage assembly carried by said frame means and operatively connected with said hook members for effecting movement thereof between said store retaining and store releasing position, a breech assembly carried by said frame means for receiving ballistic charge means capable of generating gases under pressure upon ignition, ballistic charge means within said breech assembly, electrically energized ignition means for igniting said ballistic charge means within said breech assembly so as to generate gases under pressure, an actuating member carried by said frame means in communicating relation with said breech assembly for movement in response to the generation of gases under pressure within said breech assembly into an actuating position wherein said control linkage assembly is operative to effect movement of said hook members from said store retaining position into said store releasing position, ejector means carried by said frame means in communicating relation with said breech assembly for applying an ejecting force to the store in response to the generation of gases under pressure within said breech assembly and to the movement of said hook members into said store releasing position, mechanical locking means secured to said frame means for movement between a locking position disposed within the path of movement of said control linkage assembly when said hook members are disposed in said store retaining position for positively preventing substantial movement of said control linkage assembly in a direction to effect movement of said hook members away from said store retaining position and a releasing position permitting such movement of said control linkage assembly, power operated means for effecting movement of said mechanical locking means from said locking position into said releasing position, and switch means electrically connected with said electrically energized ignition means for preventing energization of said ignition means when said locking means is in said locking position and permitting energization of said ignition means when said locking means is in said releasing position, said ejector means comprising a cylinder, a piston assembly mounted for reciprocating movement within said cylinder from an upper initial position into a lower ejecting position in response to the generation of gases under pressure in said breech assembly, valve means carried by said piston assembly disposed in a closed position communicable with the gases under pressure generated within said breech assembly when said piston assembly is disposed in said initial position in engagement with a store and movable into an open position to exhaust to atmosphere the gases under pressure acting to move said piston assembly into said ejecting position in response to the movement of the store away from said piston assembly, said piston assembly being biased to move from said ejecting position into said initial position in response to the exhaust of said gases under pressure to the atmosphere.

17. A store ejecting rack as defined in claim 16 wherein said piston assembly comprises a piston, a hollow piston rod secured to said piston and extending downwardly therefrom outwardly of said cylinder, means in the lower end of said cylinder slidably sealingly receiving the lower end of said piston rod, said piston rod having opening means therein adjacent said piston communicating the interior of said piston rod with said cylinder below said piston, said valve means communicating the interior of said piston rod with said cylinder above said piston when said valve means is disposed in said closed position and sealing the gases under pressure within the interior of said piston rod in response to the movement of said valve means into said open position so that said sealed gases under pressure serve to bias said piston and piston rod from said ejecting position into said initial position.

References Cited by the Examiner

UNITED STATES PATENTS 3,056,623   10/1962   Herbert _____ 294—33

GERALD M. FORLENZA, *Primary Examiner.*

G. ABRAHAM, *Assistant Examiner.*